(12) United States Patent
Makino et al.

(10) Patent No.: US 6,288,507 B1
(45) Date of Patent: Sep. 11, 2001

(54) MOTOR DRIVE CIRCUIT (75) Inventors: Kenichi Makino; Yuzuru Suzuki; Sakae Fujitani, all of Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/421,914

(22) Filed: Oct. 20, 1999

(30) Foreign Application Priority Data

Oct. 22, 1998 (JP) .................................................. 10-301291

(51) Int. Cl.[7] .................................................. H02P 1/22
(52) U.S. Cl. .......................... 318/293; 318/292; 318/294; 318/439
(58) Field of Search .................................. 318/138, 285, 318/254, 439, 280–299, 599, 603; 363/98; 180/446, 443, 444; 701/41; 388/811

(56) References Cited

U.S. PATENT DOCUMENTS 4,581,565 * 4/1986 Van Pelt et al. ..................... 318/294
4,710,686 * 12/1987 Guzik .................................. 318/293
6,131,692 * 10/2000 Kawasuji ............................ 180/446

* cited by examiner

Primary Examiner—Paul Ip
(74) Attorney, Agent, or Firm—Howell & Haferkamp, LC

(57) ABSTRACT

A motor drive circuit is comprised of an H-bridge circuit which is formed of a flywheel diode and a switching device and connected to a motor coil; a current detecting circuit which is connected to the H-bridge circuit, has a plurality of shunt resistors, and computes a motor coil current value on the basis of voltage drops in the shunt resistors; a memory for storing an energizing direction of the motor coil and command value data regarding an energizing current waveform; a control circuit issues energizing current amount of the motor coil so that an error between command value data stored in the memory and a detected current signal detected by the current detecting circuit always stays zero; and a switching device driving logic circuit switches both source and sink of the H-bridge circuit when the motor coil is excited.

20 Claims, 10 Drawing Sheets

FIG. 1 PRIOR ART

—— CURRENT COMMAND VALUE
-------- MOTOR COIL CURRENT

SWITCHING THE SOURCE SIDE

FIG. 2B PRIOR ART

SWITCHING THE SINK SIDE

MOTOR DRIVE CIRCUIT

BACKGROUND OF THE INVENTION

1. Field of the Invention

The present invention relates to a current-controlled motor drive circuit for implementing, in a direct drive system, motor characteristics including high output, high efficiency, and minimized variations in revolution in an extremely low speed revolution range, e.g. 50 rpm to 100 rpm required of, for example, a drum drive motor of a copier or a main motor of a laser beam printer.

2. Description of the Related Art

Figure 1:
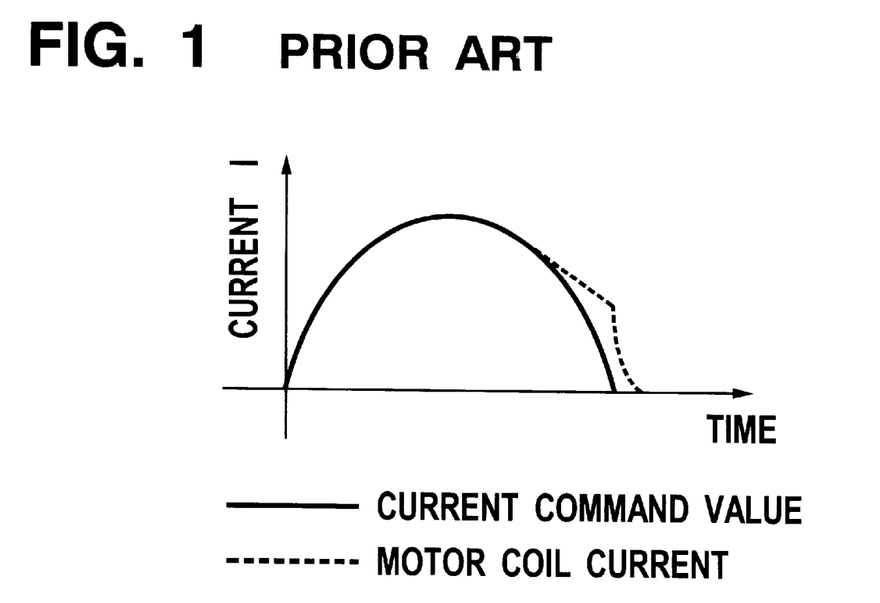
FIG. 1 shows a relationship between current command values supplied to a motor and motor coil currents.

Hitherto, drum driving motors of copiers or main motors of laser beam printers are generally controlled by pulse width modulation (PWM) using an H bridge. A motor drive circuit using the H bridge employs a system in which only a source side or a sink side is switched in an H-bridge switching mode for conducting the PWM control. In this system, an attempt to carry out sinusoidal current control (wherein sinusoidal information is added to a current command value to provide faithful sinusoidal waves while detecting motor coil current) as indicated by the solid line in FIG. 1 develops a phenomenon in which a current fall delays as indicated by the dashed line in the graph. This causes a sudden drop in current when an energizing direction is switched. Such sudden change in motor coil current in the vicinity of zero cross at which the current direction is switched is not negligible because it worsens variations in revolution. Furthermore, the motor coil current deviates from a sinusoidal command value at the time of current switching or commutation, making it impossible to obtain a current waveform that is faithful to the command value. This happens because of the following reason. When only a source side shown in FIG. 2A or a sink side shown in FIG. 2B is switched, in either case, a regenerative current i produced by counter-electromotive force passes in an independent closed loop via a flywheel diode D2 at the time of regeneration when either is switched OFF. At this time, a voltage V of a motor coil 7 is clamped by the forward voltage of a diode D2 and a FET saturation voltage (and a voltage drop in a shunt resistor Rs is added in the case of switching of the source side), so that the reduction in the regenerative current i becomes slow or is delayed. In the circuits shown in FIGS. 2A and 2B, reference characters Q1, Q2, Q3, and Q4 denote field effect transistors (FETs).

Figure 3:
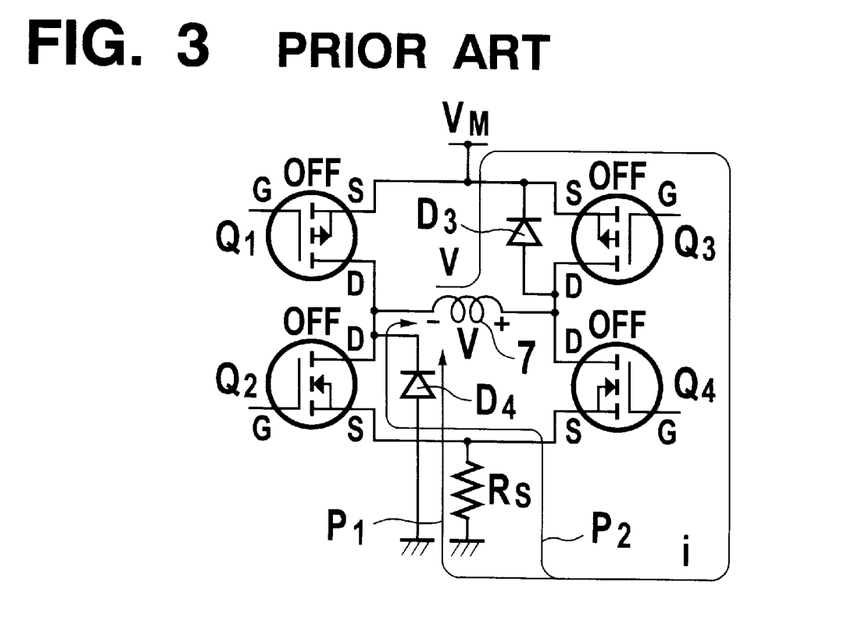
FIG. 3 is a circuit diagram illustrating an example of a current detecting circuit of the conventional motor drive circuit.

FIG. 3 shows a conventional H-bridge type current detecting circuit. In the drawing, when the source side and the sink side are switched simultaneously, there will be no problem in a powering mode because all motor coil current passes through the shunt resistor Rs. In a regeneration mode (at the moment of switching OFF), however, the regenerative current i from a counter-electromotive force flows over two paths (P1) and (P2) as shown in the drawing. In the case of path (P1), the current detecting circuit determines that no regenerative current is flowing whereas the regenerative current i is actually passing through the motor coil 7 because the current does not pass through the shunt resistor Rs in path (P1). In the case of path (P2), the current detecting circuit determines that the regenerative current is flowing in the reverse direction whereas the regenerative current i is actually flowing through the motor coil 7 in the same direction as that immediately before current supply was cut off because the direction of current passing through the shunt resistor Rs is reversed between the powering mode and the regenerative mode in the case of path (P2). Thus, the conventional current detection system has been posing a problem in that the current in the motor coil cannot be accurately detected.

There has been another problem. The regenerative mode means a switching OFF mode, providing a time zone or range wherein no control can be conducted. As a matter of fact, a PWM switching waveform directly appears or overlaps in the current detecting circuit of FIG. 3, inversely affecting the current control of the motor coil 7.

As set forth above, the conventional current detecting system has been presenting serious problems in both a drive mode of a logic circuit for driving a switching device of an H-bridge and a current detection method employing a shunt resistor, which results in making impossible to detect motor coil current quickly and accurately. As a result, the conventional current detecting system has a shortcoming in which it cannot control motor coil current in strict accordance with a sinusoidal current command value.

SUMMARY OF THE INVENTION

The present invention has been made with a view toward solving the problems described above, and an object thereof is to provide a current detecting circuit capable of solving the problem of the delay of a motor coil current fall with respect to a current command value, which is a shortcoming of a conventional current detecting system, and also capable of accurately detecting motor coil current by removing a switching noise superimposed on a current detection waveform. It is another object of the present invention to provide a current-controlled motor drive circuit capable of controlling motor coil current faithfully to a current command value by employing the current detecting circuit.

To these ends, according to a first aspect of the present invention, there is provided a current-controlled motor drive circuit comprised of: an H-bridge circuit which is formed of a flywheel diode and a switching device, and connected to a motor coil; a current detecting circuit which is connected to the H-bridge circuit, has a plurality of shunt resistors, and computes a motor coil current value on the basis of voltage drops in the shunt resistors; a memory for storing an energizing direction of the motor coil and command value data regarding an energizing current waveform; a control circuit that issues an instruction regarding an energizing current amount of the motor coil so that an error between command value data stored in the memory and a detected current signal detected by the current detecting circuit always stays zero; and a switching device driving logic circuit that PWM-drives the switching device of the H-bridge circuit on the basis of an energizing current amount command signal from the control circuit and an energizing direction command signal from the memory; wherein the switching device driving logic circuit switches both source side and sink side of the H-bridge circuit when the motor coil is excited.

According to a second aspect of the present invention, there is provided a current-controlled motor drive circuit comprised of: an H-bridge circuit which is formed of a flywheel diode and a switching device and connected to a motor coil; and a current detecting circuit which is connected to the H-bridge circuit, has a plurality of shunt resistors, and computes a motor coil current value on the basis of voltage drops in the shunt resistors, the switching device of the H-bridge circuit being PWM-driven to control a current of the motor coil; wherein both source side and sink side of the H-bridge circuit are simultaneously switched when the motor coil is excited.

In a preferred form of the present invention, the current detecting circuit is inserted independently in a current path for a motor powering mode and in a current path for a regenerating mode, a shunt resistor for detecting powering current is connected in series to a diode for blocking regenerative current to prevent inflow of regenerative current, and a shunt resistor for detecting regenerative current is connected in series to a flywheel diode for blocking powering current to prevent inflow of powering current.

With this arrangement, regenerative current quickly attenuates, providing an advantage in which the uncontrollable time at switching OFF shortens owing to the quicker attenuation with a resultant quicker control response. Moreover, a detected current value can be accurately computed since independent shunt resistors are used to separately perform detection in the powering mode and the regenerating mode of the motor.

In another preferred form of the present invention, in the current detecting circuit, when computing motor coil current from voltage drops observed at both ends of each shunt resistor, a voltage drop caused by regenerative current is added, by reversing the sign thereof, to a voltage drop caused by powering current. This arrangement provides an advantage in that the polarity of a voltage drop caused by powering current and regenerative current can be considered.

In yet another preferred form of the present invention, command value data regarding a motor coil current waveform stored in the memory is processed into a sinusoidal discrete value obtained by setting a division number in the direction of the axis of ordinate of a sinusoidal half wave to a value within a range of $2^6$ to $2^8$. Noises attributable to PWM control can be controlled and response speed is higher, thus permitting current control as faithful as that achieved when a continuous sinusoidal command value is given, despite the fact that a discrete sinusoidal command value is used.

In a further preferred form of the present invention, all shunt resistors for detecting current are inserted at a low side of the H-bridge circuit, providing an advantage in that a current value can be detected using a ground reference.

In a still further preferred form of the present invention, all shunt resistors for detecting current are inserted at a high side of the H-bridge circuit. Hence, if the drive motor coil is faulty, e.g. if the coil is short-circuited to a motor case in the motor, current flows through these shunt resistors connected to the high side of the H-bridge circuit. In this case, it is of course required to shut off current by taking corrective measures because abnormally large current passes.

In a further preferred form of the present invention, a coil of each phase of a three-phase synchronous motor is connected to the H-bridge circuit of the motor drive circuit so as to carry out current control independently for the coil of each phase.

In another preferred form of the present invention, an energizing direction of a motor coil and data regarding amplitude, phase, and waveform serving as command value data regarding an energizing current waveform that are stored in the memory are set so that they cancel mechanical and electromagnetic imbalance among phases. This arrangement is advantageous in that mechanical and electromagnetic imbalance among phases can be successfully coped with by software without adding to cost.

DESCRIPTION OF THE PREFERRED EMBODIMENTS

The present invention will now be described with reference to the accompanying drawings.

Figure 4:
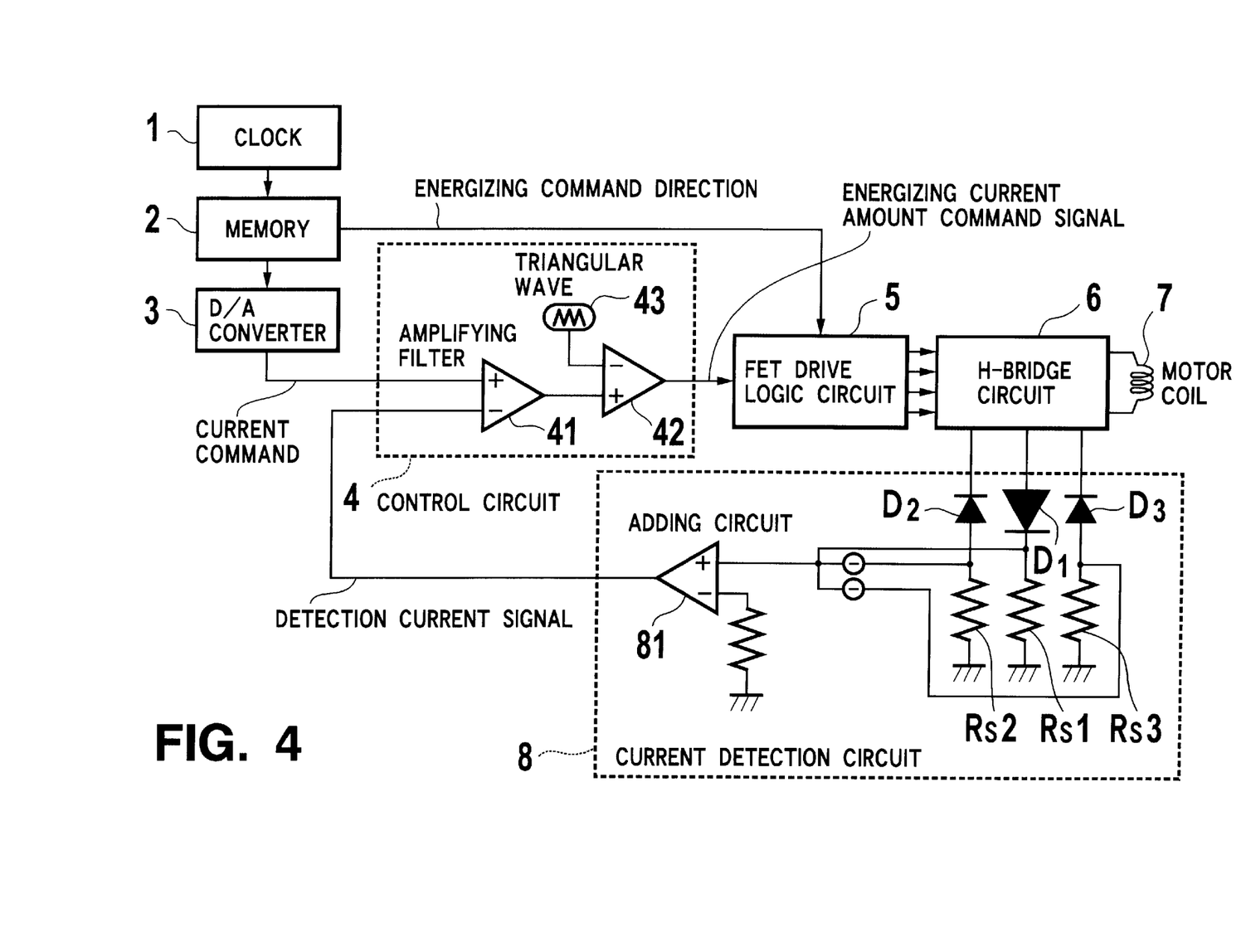
FIG. 4 is a block diagram showing an embodiment of a current-controlled motor drive circuit in accordance with the present invention.

FIG. 4 is a block diagram showing an embodiment of a motor drive circuit in accordance with the present invention. The motor drive circuit in the drawing is constituted by an H-bridge circuit 6 formed of switching devices (the description will be given of a case wherein FETs are employed as switching devices in the embodiment), a motor coil 7 connected to the H-bridge circuit 6, a memory 2 for storing command value data regarding an energizing direction and an energizing current waveform of the motor coil 7, a control circuit 4 that uses the data stored in the memory 2 as command values to instruct an energizing current amount of the motor, a FET driving logic circuit 5 for PWM-driving the FETs of the H-bridge circuit 6 on the basis of an energizing current amount command signal from the control circuit 4 and an energizing direction command signal from the memory 2, and a current detecting circuit 8 configured as described below. In the drawing, reference numeral 1 denotes a clock and reference numeral 3 denotes a D/A converter. The control circuit 4 is formed of an amplifying filter 41 and a comparator 42, a triangular wave 43 being applied to a negative terminal of the comparator 42.

The current detecting circuit 8 is composed of a shunt resistor Rs1 for detecting current in a powering mode, a diode D1 for blocking regenerative current that is connected in series to the shunt resistor Rs1, shunt resistors Rs2 and Rs3 for detecting current in a regenerative mode, flywheel diodes D2 and D3 for blocking powering current that are connected in series to the shunt resistors Rs2 and Rs3, respectively, and an adding circuit 81 that adds detected voltages of the shunt resistors Rs1, Rs2, and Rs3. The potentials detected by the shunt resistors Rs2 and Rs3 in the drawing are reversed in signs thereof before they are supplied to the adding circuit 81 (a reversing means is indicated by circled minus signs). The reversing means is composed of an inverting amplifier of gain 1 in this embodiment.

Configuring the current detecting circuit 8 and combining it with the logic of the FET driving logic circuit, which will be explained in detail hereinafter, enables a quicker detection response of a motor coil current especially because current attenuates more quickly in the regenerative mode, and also permits the motor coil current to be accurately and separately detected in the powering mode and the regenerative mode of the motor. The current-controlled motor drive circuit of FIG. 4 that employs the current detecting circuit 8 is able to control motor coil current faithfully to a sinusoidal current command of a current command value stored in the memory 2. Especially these days when it has become a common sense to form motor coil current into a sinusoidal shape to improve revolution accuracy, the present invention that allows quick, faithful current detection simply by using inexpensive shunt resistors is useful.

Figure 5:
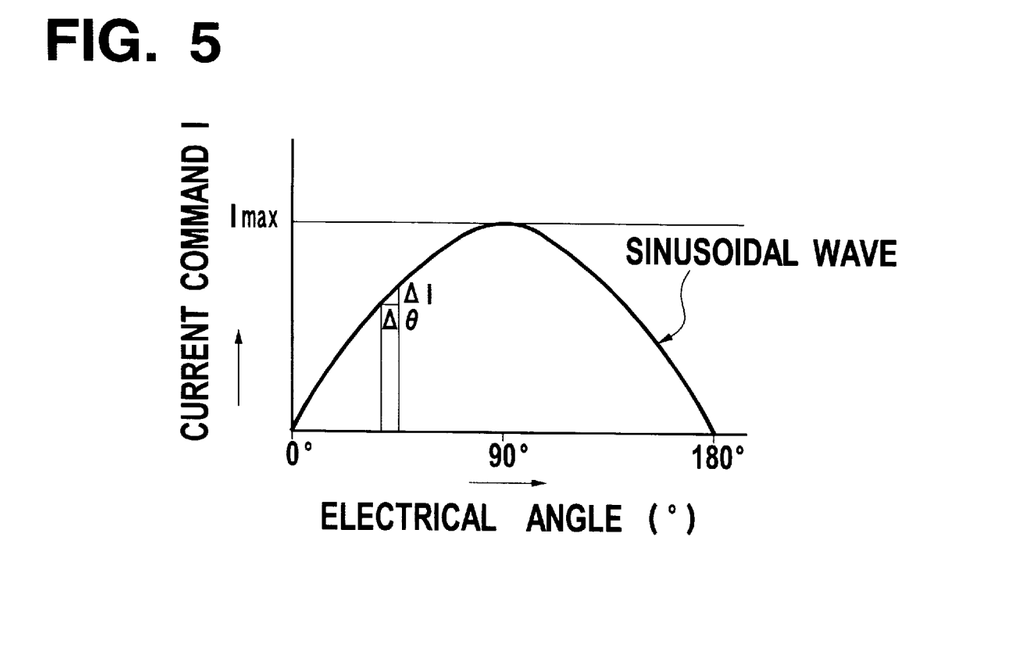
FIG. 5 shows an example of stored contents of a memory.

The current command value data of the memory 2 is given in terms of a sinusoidal wave in discrete approximation, and the larger the division number, the better. In an example shown in FIG. 5, for instance, satisfactory characteristics have been obtained by a current command value which was provided by quantizing an amplitude of a sinusoidal half wave into a binary code of $2^8=256$ (8 bits). Experiment results have indicated that characteristics acceptable for practical use can be obtained even when a smaller division number, namely, $2^6$ (64 divisions) or $2^7$ (128 divisions), is used. In the example of FIG. 5, the division number in the direction of the axis of abscissa of the sinusoidal half wave, which is equivalent to 180 degrees in terms of an electrical angle, of current command value data is 3360. This corresponds to an electrical angle of about 0.0536 degree per division, permitting adjustment of a phase angle of 0.0536 degree.

It can be easily understood that the current command data of the memory 2 may be a distorted wave over which a small amount of higher harmonic (to be specific, about 3% or less of third harmonic) is superimposed in place of a sinusoidal wave to correct cogging torque. In short, information for compensating for a shortcoming peculiar to the driving motor or information particular to a control factor (e.g. speed or position although a current value is indicated in FIG. 4), the controllability of which need to be improved may be stored in advance.

Figure 6:
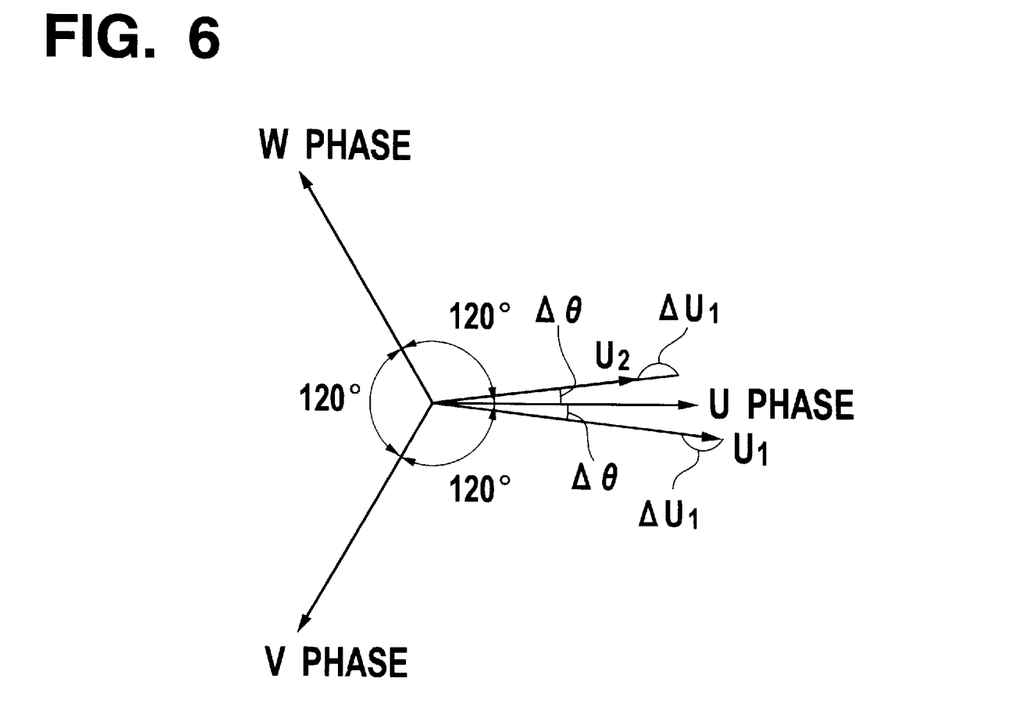
FIG. 6 shows vectors of voltages applied to individual phases of a motor in which three phases are independently driven.

To be specific, when three phases are driven independently, at the time of mechanical assembling, for example, as illustrated by a vector diagram of FIG. 6 which shows ideal U phase, V phase, and W phase, if only a U-phase vector is like a vector U1 or a U2 vector having its phase and amplitude deviated from an ideal vector U by a phase difference $\Delta\theta$ and an amplitude $\Delta U$ due to variations in mechanical assembly, then data stored in the memory 2 of the U phase may be corrected against the deviations. This makes it possible to compensate for mechanical variations when the coil is excited. In other words, in an ideal state (if there are no mechanical variations), data, which is supposed to be stored as the vector U, will be stored as the vector U2. The same obviously can be applied for making corrections if other phases have deviations.

First, a drive mode of a conventional switching device driving logic circuit 5 will be discussed.

Figure 2A:
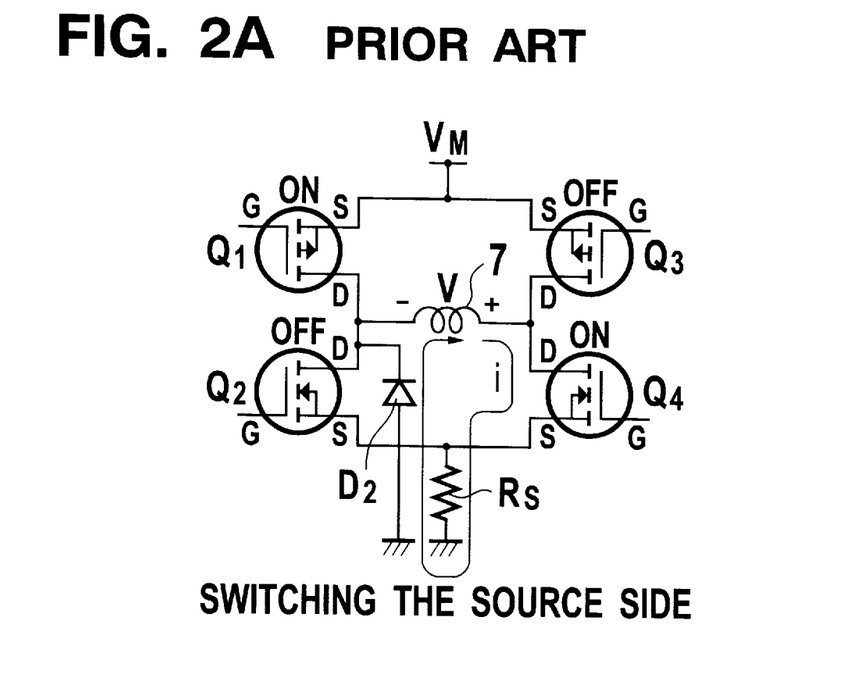
FIG. 2A shows a current path when a source side is switched in a conventional motor drive circuit.
Figure 2B:
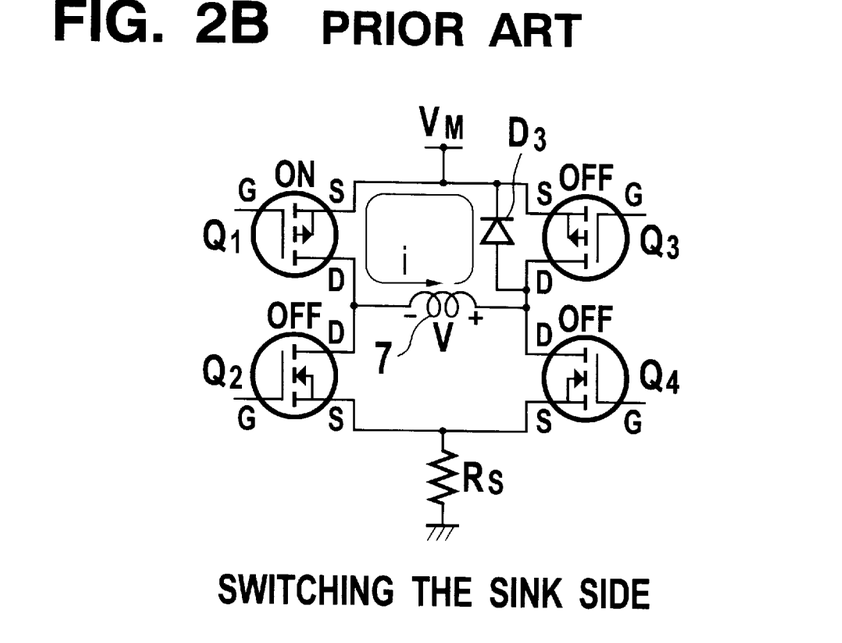
FIG. 2B shows a current path when a sink side is switched in the conventional motor drive circuit.
Figure 7:
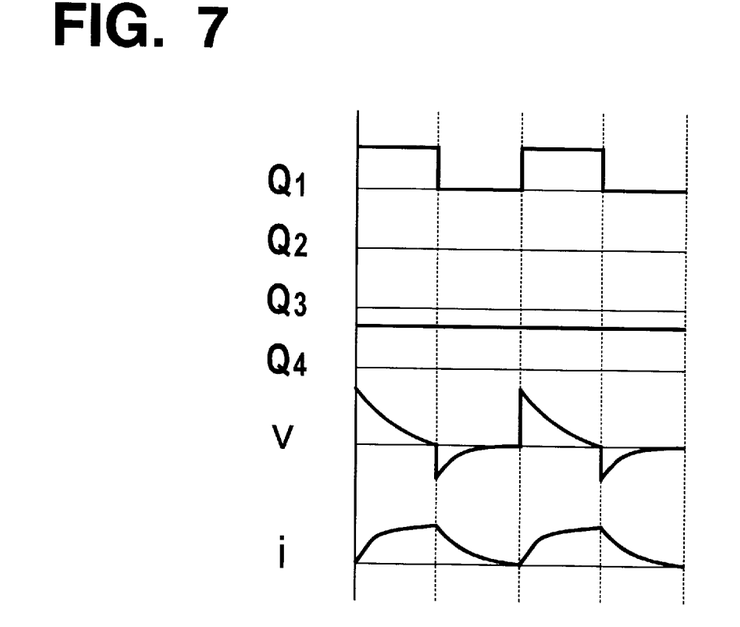
FIG. 7 is a timing chart of current passing through FETs of an H-bridge circuit, counter-electromotive force, and regenerative current in conventional current control.

In the conventional current-controlled motor drive circuit employing the H-bridge configuration shown in FIGS. 2A and 2B, the conventional current detecting circuit employs only the shunt resistor Rs for the convenience of description. As the description has already been given of the prior art and the problems therewith, to perform switching for the PWM control, only the source or sink of the H bridge is switched in the conventional method. In the regenerative mode wherein Q1 (switching the source) or Q4 (switching the sink) is turned OFF from a state wherein Q1 and Q4 are ON, whereas Q2 and Q3 are OFF, the path of the regenerative current i produced by the counter-electromotive force of the coil will be as indicated by the solid line in FIG. 1. At this time, the paths are slightly different depending on whether the source or the sink is switched; however, in either case, the regenerative current i of the counter-electromotive force is passed in an independent closed loop via the flywheel diode D2 at the time of switching OFF. A counter-electromotive voltage V of the coil at this time is clamped by a forward voltage of the diode and a saturation voltage of the FET (a voltage drop of the shunt resistor Rs will be further added when the source is switched), so that attenuation of the regenerative current i will be considerably gentle as indicated by a waveform i in FIG. 7. This leads to a shortcoming, especially in the case of a sinusoidal current command, in that a fall of the motor coil current delays with respect to a current command value in the vicinity of zero cross where current changes suddenly.

On the other hand, the switching device driving logic circuit 5 in accordance with the present invention employs a method in which both source and sink of the H bridge are switched at the same time to conduct the PWM control. This will be described with reference to FIG. 3. A conventional current detecting system using only the shunt resistor Rs is shown in FIG. 3 for the convenience of explanation.

Figure 8:
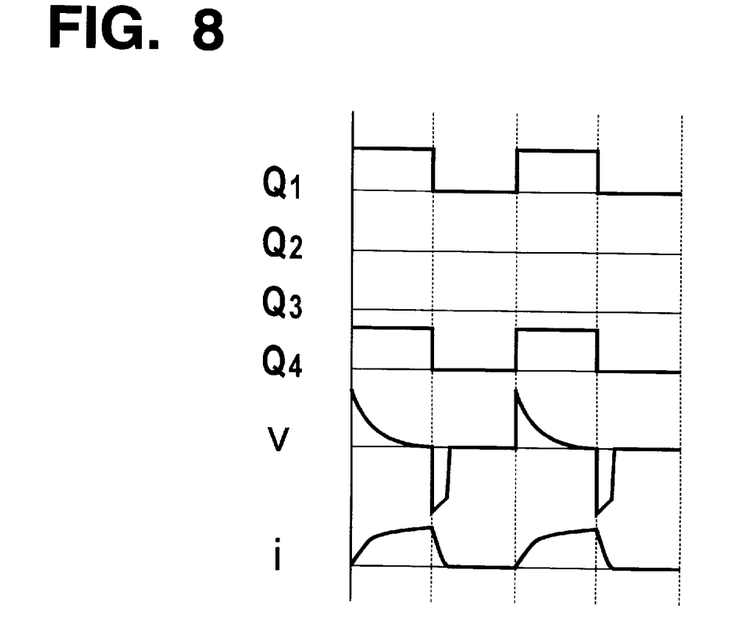
FIG. 8 is a timing chart of current passing through FETS of an H-bridge circuit, counter-electromotive force, and regenerative current in a motor drive circuit, obtained when both source side and sink side of the H-bridge circuit on the conventional motor drive circuit shown in FIG. 3 are simultaneously switched ON or OFF.
Figure 9:
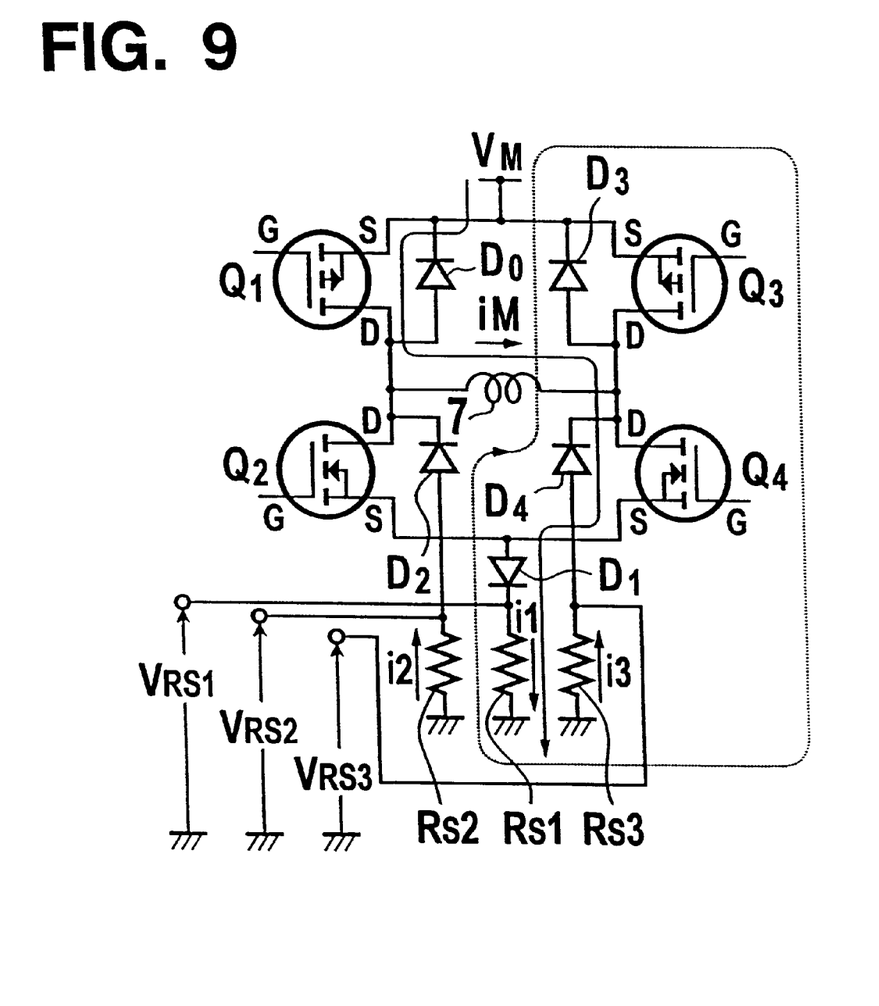
FIG. 9 is a circuit diagram showing a first embodiment of a current detecting circuit of the motor drive circuit in accordance with the present invention.

In the system of the present invention, the path of the regenerative current i of the counter-electromotive force observed at the moment when the powering mode wherein Q1 and Q4 are ON while Q2 and Q3 are OFF is changed over to the regenerative state wherein Q1 and Q4 are turned OFF is indicated by the solid line in the drawing. At this time, the regenerative current i of the counter-electromotive force is passed through two routes, namely, a route in which the current i passes through a flywheel diode D3, a power supply, the shunt resistor Rs, and an internal protective diode of Q2 (the route (P2) of FIG. 3), and another route in which the current i passes through the power supply and a flywheel diode D4 (the route (P1) of FIG. 3). At this time, a motor coil voltage V is forcibly raised to a line voltage VM, causing the regenerative current i to suddenly attenuate as indicated by the waveform i of FIG. 8. This means that the sudden change in which attenuation of the regenerative current i quickly settles is desirable because it permits quicker control responses, since the regenerative mode engaged by switching OFF is basically a time zone or area where no control is enabled. Thus, the problem of the delayed fall of the motor coil current with respect to a current command value can be solved.

The motor current detecting circuit 8, which represents another important technology for the present invention, will now be described.

It has been described that the regenerative current i of the counter-electromotive force flows along the routes shown in FIG. 3 at the time of switching OFF when both the source and the sink are simultaneously switched in the current-controlled motor drive circuit having the conventional H-bridge configuration. The current detection waveform will be as illustrated by the waveform at the bottom in FIG. 8, and the PWM switching waveform will directly appear as the current detection waveform. Using the current detection waveform as it is for a current detecting signal of the control circuit 4 in FIG. 4 causes a PWM noise to be superimposed on an energizing current amount command signal to be output, resulting in extremely deteriorated controllability. To cope with this shortcoming of the conventional system, there is a method wherein the current detection waveform is passed through a low-pass filter to remove a PWM high-frequency noise before using it. The time constant of the low-pass filter, however, is relatively large (a time constant ranging from 50 to 500 $\mu$s is required for removing a PWM carrier frequency of about 20 kHz), leading to a delay of a detecting signal. This has been disadvantageously exerting influences at a point (e.g. a zero cross point in the case of sinusoidal energization) where sudden time-dependent changes of motor coil current take place, adversely affecting control waveforms.

Figure 10:
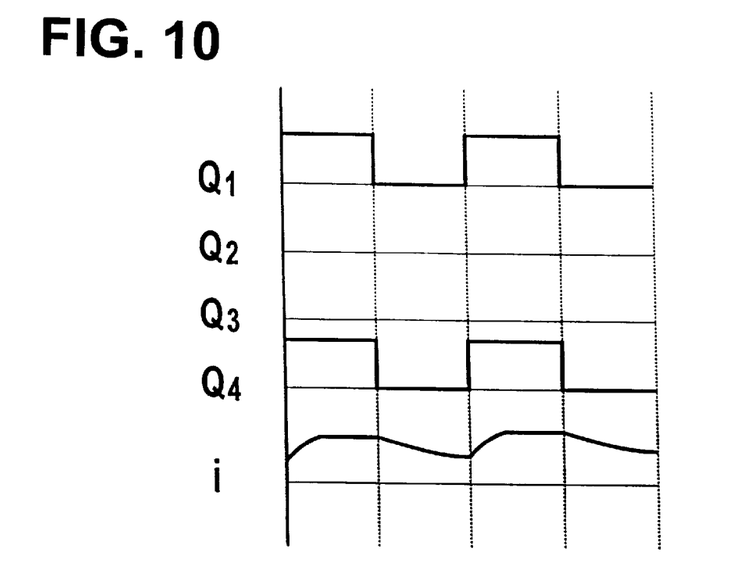
FIG. 10 is a timing chart of current passing through FETs of an H-bridge circuit, counter-electromotive force, and regenerative current in the first embodiment of a current detecting circuit of the motor drive circuit in accordance with the present invention.

A specific embodiment of the current detecting circuit 8 of the motor drive circuit in accordance with the present invention shown in FIG. 4 is illustrated in FIG. 10. The solid lines indicate a powering current route used in a motor powering mode wherein Q1 and Q4 are ON, while Q2 and Q3 are OFF. The dashed line in the drawing indicates a regenerative current route of the counter-electromotive force in a so-called motor regenerative mode wherein Q1 and Q4 are turned OFF after the motor powering mode. Referring to the drawing, the embodiment is constituted by a shunt resistor section for detecting powering current wherein a shunt resistor Rs1 and a diode D1 for blocking regenerative current that is connected in series to the shunt resistor Rs1 are connected to the powering current route at the low side of the H-bridge circuit, and a shunt resistor section for detecting regenerative current wherein shunt resistors Rs2 and Rs3 and so-called flywheel diodes D2 and D4 for blocking power current that are respectively connected in series to the shunt resistors Rs2 and Rs3 are connected to two regenerative current routes.

A current detecting signal $V_0$ (a voltage value corresponding to a motor coil current) is computed according to arithmetic expression (1) from detected potentials of shunt resistors Rs1, Rs2, and Rs3 in the current detecting circuit 8 of FIG. 4.

$$V_0 = VRs1 - (VRs2 + VRs3) = i_1 \times Rs1 - (i_2 \times Rs2 + i_3 \times Rs3) \quad (1)$$

(Note that the current polarities of $i_2$ and $i_3$ are opposite from the current polarity of $i_1$.)

Figure 11:
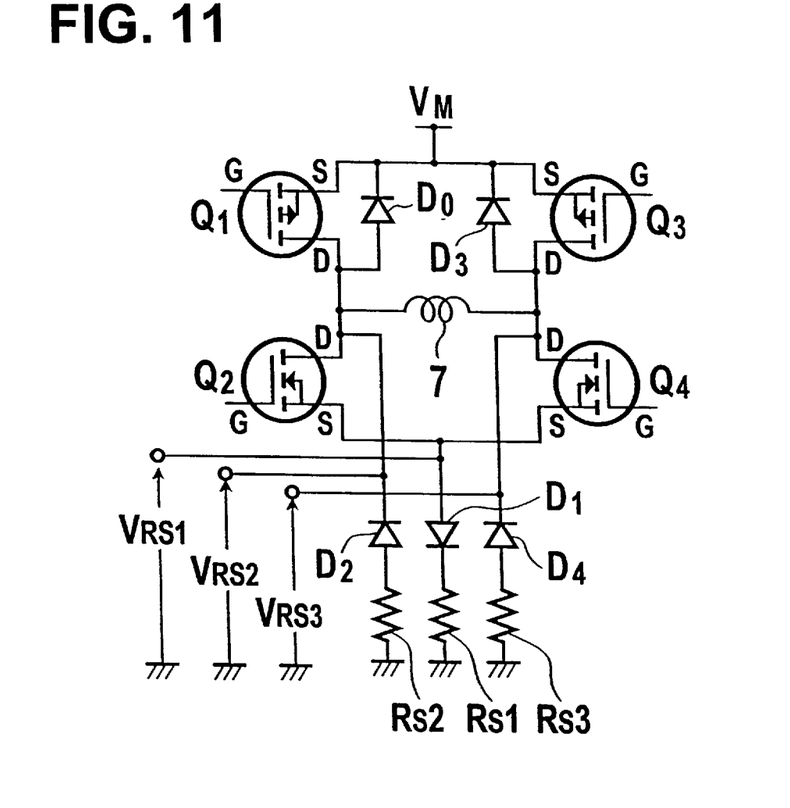
FIG. 11 is a circuit diagram showing a second embodiment of the current detecting circuit of the motor drive circuit in accordance with the present invention.

Obtaining the current detecting signal by the above computation has made it possible to detect a current signal that exactly corresponds to the actual current passing through the motor coil. The waveform of the current detecting signal or detecting voltage at this time is shown by i in FIG. 11. As can be seen from the diagram, the current detection waveform is considerably smoother than that shown in FIG. 8, which is obtained by simultaneously switching on or off both source side and sink side of the H-bridge circuit of the conventional motor drive circuit shown in FIG. 3. Thus, the signal can be used for control merely by passing it through a filter with a small delay, enabling reliable control without a delay even at a point of a sudden time-dependent change in current.

The control circuit 4 of the motor drive circuit in accordance with the present invention shown in FIG. 4 will be briefly explained.

The system based on the present invention employs PWM type energizing current amount control. To be more specific, a command value of an energizing current waveform is read from the memory 2, the command value and a current detecting signal from the current detecting circuit 8 are differentially amplified and filtered through an amplifying filter 41, then the result is compared with a triangular wave of a fixed rate that is generated by an internal timer circuit by a comparator 42 to obtain a PWM signal. In this system, the PWM signal has a fixed rate (the carrier frequency is 20 kHz); however, a variable rate method using, for example, a flip-flop or the like may be used instead.

The characteristics of the memory 2 for storing command value data regarding an energizing direction and an energizing current waveform of the motor shown in FIG. 4 will now be described.

In the system according to the present invention, the motor coil 7 has independent phases. For example, a motor having three phases are provided with three configurations of FIG. 4 entirely independently, so that three motor coils are individually and independently driven. This system makes it possible to independently set current command values (namely, amplitude, phase, waveform shape, etc.) for the coil of each phase by the memory 2, thus providing an advantage in that, for example, mechanical or electromagnetic variations produced in the assembly process of a motor can be absorbed. In particular, mechanical and electromagnetic errors are produced in each phase during manufacture, frequently leading to imbalance among phases. Therefore, variations in revolution caused by variations in manufacture can be improved without adding to cost by grasping information on such mechanical and electromagnetic errors beforehand and by storing it as the information for compensating for the imbalance in the memory 2 that can be set for each phase.

Figure 12:
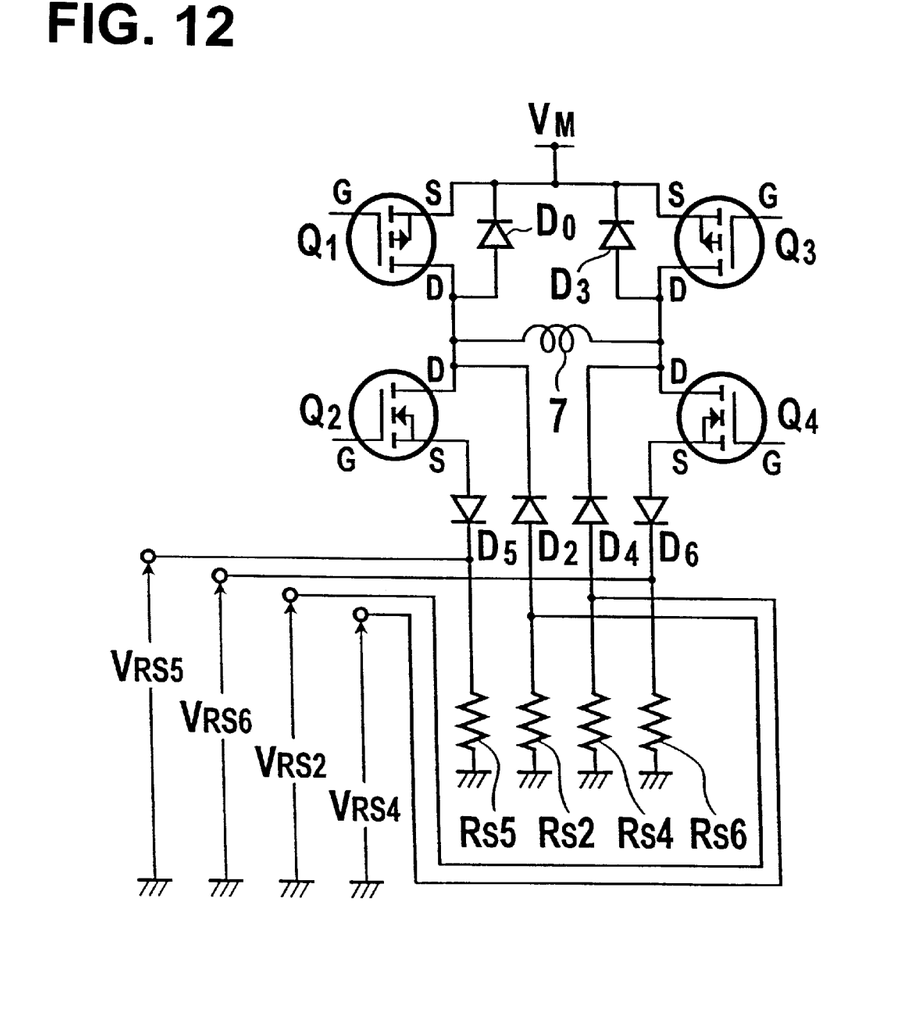
FIG. 12 is a circuit diagram showing a third embodiment of the current detecting circuit of the motor drive circuit in accordance with the present invention.

FIG. 12 shows a second embodiment of the current detecting circuit of the motor drive circuit in accordance with the present invention; it shows an example of the current detecting circuit in which a shunt resistor is inserted at the low side of an H bridge. In this embodiment, the connecting order of the shunt resistors Rs1, Rs2, and Rs3, and the current blocking diodes D1, D2, and D4 that are respectively connected in series is reversed from that in the current detecting circuit of the embodiment shown in FIG. 4. A detected voltage includes a forward voltage $V_f$ (approximately 0.7 V) of the diodes, which is acceptable. In the circuit diagram, reference characters Q1, Q2, Q3, and Q4 denote FETs, and D0 and D3 denote diodes.

Figure 13:
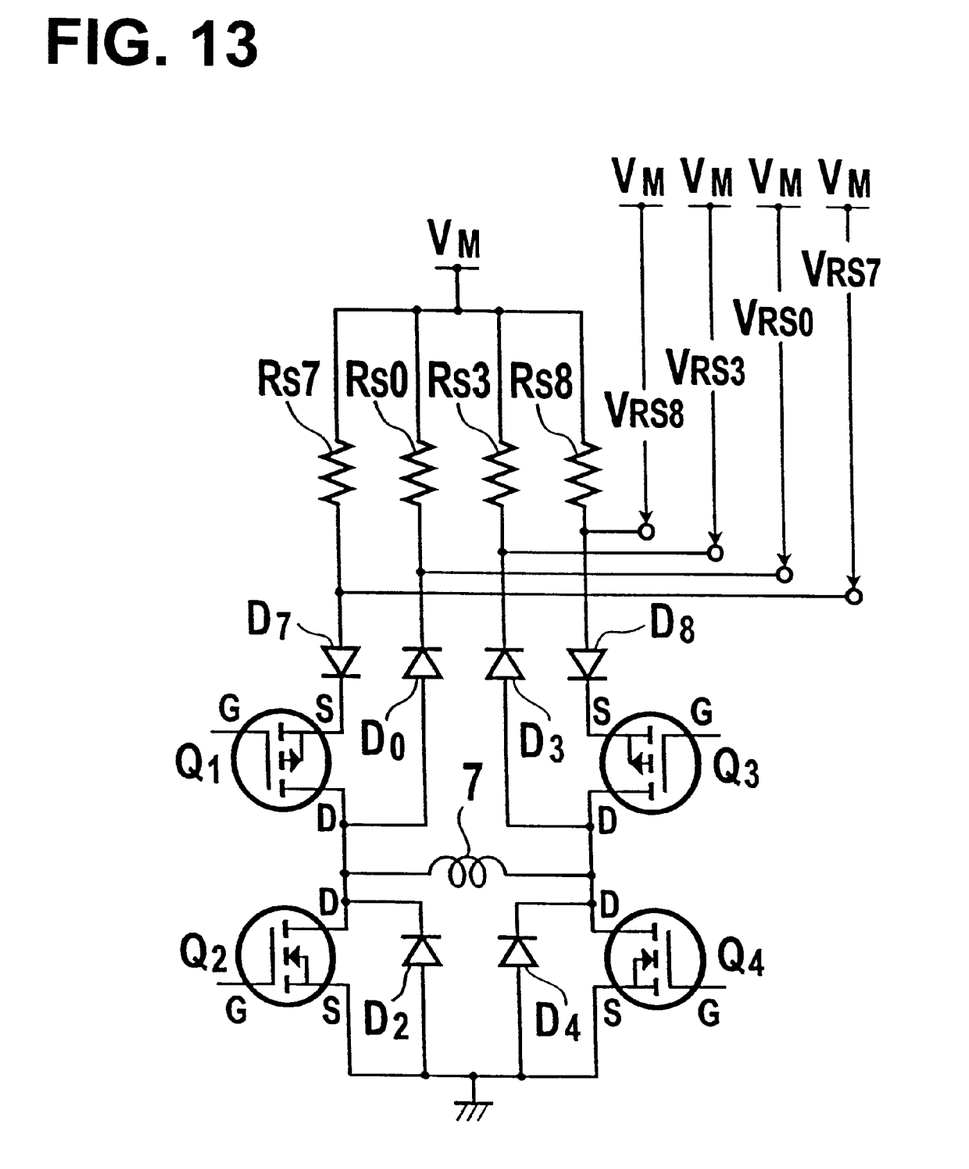
FIG. 13 is a circuit diagram showing a fourth embodiment of the current detecting circuit of the motor drive circuit in accordance with the present invention.

FIG. 13 shows a third embodiment of the current detecting circuit of the motor drive circuit in accordance with the present invention. In the current detecting circuit, shunt resistors Rs2, Rs4, Rs5, and Rs6 are inserted at the low side of the H bridge in series to current blocking diodes D2, D4, D5, and D6. This embodiment has added one detection route for powering current mode to the first embodiment. Except this, the circuit configuration is identical to that of the second embodiment. The current detecting signal (voltage value corresponding to a motor coil current) $V_O$ in this case is computed according to expression (2) given below.

$$V_O = VRs5 + VRs6 - (VRs2 + VRs4) \quad (2)$$

Figure 14:
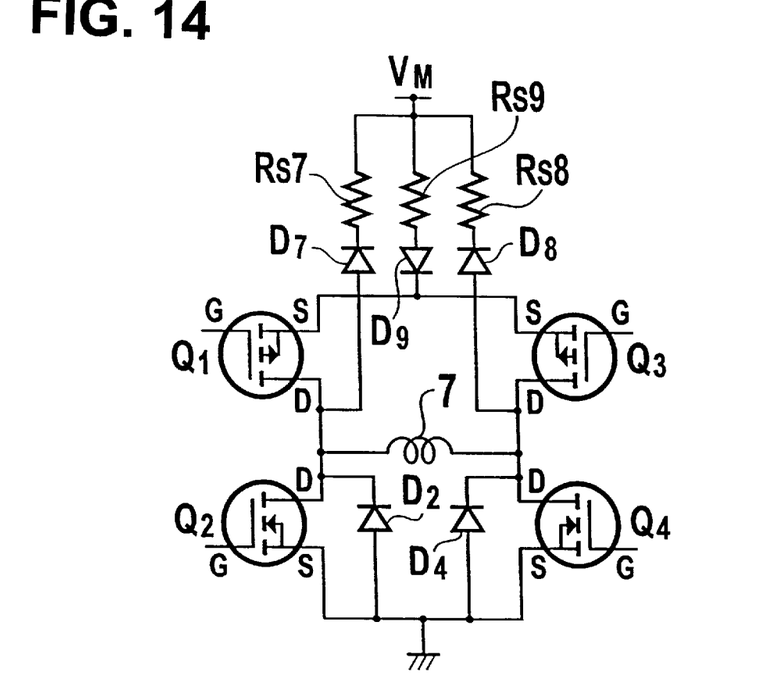
FIG. 14 is a circuit diagram showing a fifth embodiment of the current detecting circuit of the motor drive circuit in accordance with the present invention.

FIG. 14 shows a fourth embodiment of the current detecting circuit of the motor drive circuit in accordance with the present invention. In the current detecting circuit, shunt resistors Rs0, Rs3, Rs7, and Rs8 are inserted at the high side of the H bridge in series to current blocking diodes D0, D3, D7, and D8. This embodiment indicates a complete twin current detecting circuit of the third embodiment. The rest of the circuit configuration is identical to that of the second embodiment. The fourth embodiment is characterized by an advantage provided by the shunt resistors inserted at the high side of the H bridge in that, even if a part of the motor coil 7 is short-circuited to a motor case as set forth above, abnormal current always passes through the shunt resistor, enabling detection of the abnormal current in case of a motor failure. The current detecting signal (the voltage value corresponding to the motor coil current) $V_O$ in this case is computed according to expression (3) given below.

$$V_O = VRs0 + VRs3 - (VRs7 + VRs8) \quad (3)$$

Figure 15:
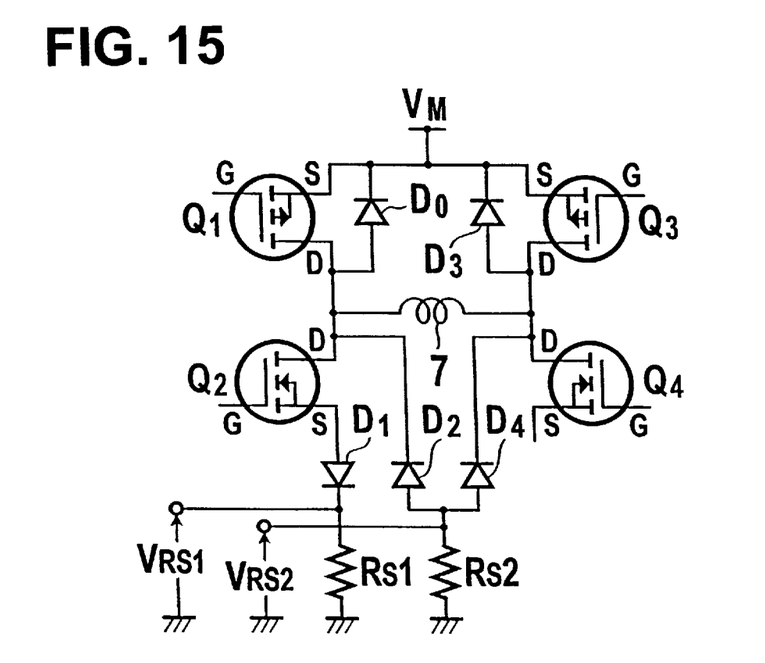
FIG. 15 is a circuit diagram showing a sixth embodiment of the current detecting circuit of the motor drive circuit in accordance with the present invention.

FIG. 15 shows a fifth embodiment of the current detecting circuit of the motor drive circuit in accordance with the present invention. In the current detecting circuit, shunt resistors Rs7, Rs8, and Rs9 are inserted at the high side of the H bridge. The rest of the circuit configuration is identical to that of the fourth embodiment. The fifth embodiment is a complete twin current detecting circuit of the first embodiment. The fifth embodiment also has the shunt resistors inserted at the high side of the H bridge, permitting detection of a motor failure such as a short-circuit of a coil to a case.

FIG. 16 shows a sixth embodiment of the current detecting circuit of the motor drive circuit in accordance with the present invention. In the current detecting circuit, shunt resistors Rs1 and Rs2 are inserted at the low side of the H bridge. The sixth embodiment is different from the first embodiment in that the number of the regenerative current detection resistors have been further reduced to lower the cost. The current detecting signal (the voltage value corresponding to the motor coil current) $V_O$ in this case is computed according to expression (4) given below.

$$V_O = VRs1 - VRs2 \quad (4)$$

Thus, the present invention has been described partly with reference to a three-phase motor; however, the invention is not limited to three-phase motors. Obviously, the invention can be applied irrespectively of the number of phases of a driving motor. Likewise, the invention can be applied to any types of motors including a synchronous motor, an induction motor, a stepping motor, and a DC motor as long as it is a rotating machine that applies electromagnetism.

The present invention enables quick, faithful detection motor coil current by using inexpensive shunt resistors. The invention is especially characterized by its capability of removing noises superimposed when carrying out PWM control without the necessity for a large filter constant. Furthermore, the current-controlled motor drive circuit equipped with the current detecting circuit is advantageous in that it is capable of controlling the motor coil current waveform faithfully to a current command without a delay.

There is another advantage in that a motor coil current waveform can be corrected or finely adjusted for each phase as necessary by storing an arbitrary current waveform of motor coil current as a command value for each phase independently in a memory, which is one of the components.

Overall, applying the present invention, for example, to the drum drive of a copier or the main motor of a laser beam printer which are required to provide such motor characteristics as high output, high efficiency, and minimized variations in revolution in an extremely low speed revolution range makes it possible to directly drive them. This arrangement provides such advantages as a reduction in total cost of a driving system.

What is claimed is:

1. A motor drive circuit comprising:
    an H-bridge circuit which is formed of a flywheel diode and a switching device and connected to a motor coil;
    a current detecting circuit which is connected to the H-bridge circuit, has a plurality of shunt resistors, and computes a motor coil current value on the basis of voltage drops that occur in the shunt resistors;
    a memory for storing an energizing direction of a motor coil and command value data regarding an energizing current waveform;
    a control circuit that controls an energizing current amount of the motor coil so that an error between command value data stored in the memory and a detected current signal detected by the current detecting circuit always stays zero; and
    a switching device driving logic circuit that PWM-drives the switching device of the H-bridge circuit on the basis of an energizing current amount command signal from the control circuit and an energizing direction command signal from the memory;
    wherein the switching device driving logic circuit switches both source and sink of the H-bridge circuit when the motor coil is excited.

2. A motor drive circuit according to claim 1, wherein the current detecting circuit is inserted independently in a current path for a motor powering mode and in a current path for a regenerating mode, a shunt resistor for detecting powering current is connected in series to a diode for blocking regenerative current to prevent inflow of regenerative current, and a shunt resistor for detecting regenerative current is connected in series to a flywheel diode for blocking powering current to prevent inflow of powering current.

3. A motor drive circuit according to claim 2, wherein all shunt resistors of the current detecting circuit are inserted at a low side of the H-bridge circuit.

4. A motor drive circuit according to claim 2, wherein all shunt resistors of the current detecting circuit are inserted at a high side of the H-bridge circuit.

5. A motor drive circuit according to claim 1, wherein the current detecting circuit adds a voltage drop caused by regenerative current, by reversing the sign thereof, to a voltage drop caused by powering current when computing motor coil current on the basis of voltage drops occurring at both ends of each shunt resistor.

6. A motor drive circuit according to claim 1, wherein the command value data regarding the energizing current waveform stored in the memory is a sinusoidal discrete value obtained by quantizing an amplitude of a sinusoidal half wave into a binary code of $2^6$ to $2^8$.

7. A motor drive circuit according to claim 6, wherein the energizing direction of a motor coil and data regarding amplitude, phase, and waveform serving as command value data of an energizing current waveform that are stored in the memory are set so that they cancel mechanical and electromagnetic imbalance among phases.

8. A motor drive circuit according to claim 1 configured for use with a three-phase synchronous motor, wherein three of said motor drive circuits are configured such that the motor coil to which each H-bridge circuit of said motor drive circuits is connected is a coil of a different phase of the three-phase synchronous motor so as to carry out current control for the coil of each phase.

9. A motor drive circuit comprising:
   an H-bridge circuit which is formed of a flywheel diode and a switching device and connected to a motor coil; and
   a current detecting circuit which is connected to the H-bridge circuit, has a plurality of shunt resistors, and computes a motor coil current value on the basis of voltage drops that occur in the shunt resistors;
   the switching device of the H-bridge circuit being PWM-driven to control a current of the motor coil;
   wherein both source and sink of the H-bridge circuit are simultaneously switched when the motor coil is excited.

10. A motor drive circuit according to claim 2 configured for use with a three-phase synchronous motor, wherein three of said motor drive circuits are configured such that the motor coil to which each H-bridge circuit of said motor drive circuits is connected is a coil of a different phase of the three-phase synchronous motor so as to carry out current control for the coil of each phase.

11. A motor drive circuit according to claim 2, wherein the current detecting circuit is inserted independently in a current path for a motor powering mode and in a current path for a regenerating mode, a shunt resistor for detecting powering current is connected in series to a diode for blocking regenerative current to prevent inflow of regenerative current, and a shunt resistor for detecting regenerative current is connected in series to a flywheel diode for blocking powering current to prevent inflow of powering current.

12. A motor drive circuit according to claim 11, wherein all shunt resistors of the current detecting circuit are inserted at a low side of the H-bridge circuit.

13. A motor drive circuit according to claim 11, wherein all shunt resistors of the current detecting circuit are inserted at a high side of the H-bridge circuit.

14. A motor drive circuit according to claim 2, wherein the current detecting circuit adds a voltage drop caused by regenerative current, by reversing the sign thereof, to a voltage drop caused by powering current when computing motor coil current on the basis of voltage drops occurring at both ends of each shunt resistor.

15. A driver for a three-phase synchronous motor, said three-phase synchronous motor having a coil for each of said phases, said driver comprising three motor drive circuits according to either claim 1 or claim 2, wherein each H-bridge circuit of said motor drive circuits is connected to a different coil of said motor.

16. A driver according to claim 15 wherein said three motor drive circuits are motor drive circuits according to claim 1.

17. A driver according to claim 16, wherein, for each motor drive circuit, the energizing direction of a motor coil to which that motor drive circuit is connected and data regarding amplitude, phase, and waveform serving as command value data of an energizing current waveform that are stored in the memory of that motor drive circuit are set so that they cancel mechanical and electromagnetic imbalance among phases.

18. A driver according to claim 16, wherein the current detecting circuit of each motor drive circuit adds a voltage drop caused by regenerative current, by reversing the sign thereof, to a voltage drop caused by powering current when computing motor coil current on the basis of voltage drops occurring at both ends of each shunt resistor.

19. A driver according to claim 15, wherein said three motor drive circuits are motor drive circuits according to claim 2.

20. A driver according to claim 19, wherein the current detecting circuit of each motor drive circuit adds a voltage drop caused by regenerative current, by reversing the sign thereof, to a voltage drop caused by powering current when computing motor coil current on the basis of voltage drops occurring at both ends of each shunt resistor.

* * * * *